United States Patent
Patel et al.

(10) Patent No.: US 9,164,590 B2
(45) Date of Patent: Oct. 20, 2015

(54) SYSTEM AND METHOD FOR AUTOMATED CAPTURE AND COMPACTION OF INSTRUCTIONAL PERFORMANCES

(75) Inventors: Nilesh Patel, Rochester, MI (US); Scott Kroll, Clawson, MI (US); Mark Schwartz, Orchard Lake, MI (US)

(73) Assignee: Kevadiya, Inc., Rochester, MI (US)

( * ) Notice: Subject to any disclaimer, the term of this patent is extended or adjusted under 35 U.S.C. 154(b) by 58 days.

(21) Appl. No.: 13/995,266

(22) PCT Filed: Dec. 22, 2011

(86) PCT No.: PCT/US2011/066903
§ 371 (c)(1),
(2), (4) Date: Jun. 18, 2013

(87) PCT Pub. No.: WO2012/088443
PCT Pub. Date: Jun. 28, 2012

(65) Prior Publication Data
US 2013/0285909 A1    Oct. 31, 2013

Related U.S. Application Data

(60) Provisional application No. 61/460,025, filed on Dec. 24, 2010.

(51) Int. Cl.
*G06F 3/033* (2013.01)
*G09G 5/08* (2006.01)
*G06F 3/01* (2006.01)
*G09B 5/00* (2006.01)
*G09B 7/02* (2006.01)

(52) U.S. Cl.
CPC *G06F 3/017* (2013.01); *G09B 5/00* (2013.01); *G09B 7/02* (2013.01)

(58) Field of Classification Search
None
See application file for complete search history.

(56) References Cited

U.S. PATENT DOCUMENTS

| | | |
|---|---|---|
| 2006/0168525 A1 | 7/2006 | Tsai et al. |
| 2008/0069441 A1 | 3/2008 | Forutanpour |
| 2008/0186255 A1 | 8/2008 | Cohen et al. |
| 2010/0066676 A1 | 3/2010 | Kramer et al. |
| 2010/0208033 A1 | 8/2010 | Edge et al. |
| 2010/0281440 A1 | 11/2010 | Underkoffler et al. |

OTHER PUBLICATIONS

International Search Report and Written Opinion of the ISA for PCT/US2011/066903 ISA/US, mailed Apr. 27, 2012.

*Primary Examiner* — Nicholas Lee
(74) *Attorney, Agent, or Firm* — Harness, Dickey & Pierce, PLC (57) ABSTRACT

The system comprises functionality for instructors to record their lessons in an easy method while allowing them to capture their teaching techniques with a tool which improves the effectiveness of the playback, by reverse scripting of the teachers motions and use of educational tools including blackboards, whiteboards, and tablet computers among others and automating highlight of the relevant multiple media channels for best emphasis during presentation. Access to the centralized lesson database will permit students to learn from the best teachers and instructors and can execute the system right on their desktops or portable computers or access it through a dedicated website. Playback may be personalized to the needs and preferences of each student and the conceptual content is essentially highlighted in video and audio to maximize didactic effectiveness of presentation.

13 Claims, 11 Drawing Sheets

SYSTEM AND METHOD FOR AUTOMATED CAPTURE AND COMPACTION OF INSTRUCTIONAL PERFORMANCES

FIELD

This disclosure relates to a system and method for the capture of audio, video, and key motions of an instructor, and then recombination of these captured lessons for real-time or future display.

BACKGROUND

With the advent of overhauling or even shutting of failing schools there is a clear need for removing teachers who are most underperforming. A logical adjunct to this approach is to duplicate the performance of the most effective teachers. In the conventional approach a video camera is used to record the teacher giving a lecture. The recorded lecture is then distributed to remote classrooms where the students watch the recorded lecture on a TV monitor. Alternatively, the lecture may be captured by video camera and broadcast live to remote classroom TV monitors in real time. In either case, image quality is often inadequate. Although the students can see the image of the teacher speaking, it is often difficult to make out what the teacher has written on the board (whiteboard, blackboard or chalkboard) and similarly difficult to see software generated images (e.g., slide shows, video clips, etc.) being displayed at the teacher's location.

Simply increasing the resolution of the video camera to better render this difficult-to-see material does not adequately solve the problem. First, increasing resolution means increasing bandwidth requirements, which may not be practical or cost effective. Second, during the live recording session the teacher may inadvertently block the board or slide presentation as he or she speaks, preventing that information from being captured by the video camera.

SUMMARY

The technology of present disclosure facilitates recording, capture, and storage for real-time and repeatable viewing of performances, such as performances of educational lectures. With this technology the teaching delivery of the best educators can be captured and delivered to many students in an engaging way that transcends the conventional video recording of a teacher giving a lecture.

Disclosed is a new system and method to assist in the automation of performance acquisition which also provides means for the automated scripting of the instructional performance with embedded digitized teacher motions and supplemental materials, compact lesson storage, and subsequent viewing of the specially augmented scripted performance.

The system captures and processes mixed media input signals of the instructor's performance to maximize efficiency of storage in computer memory and permit analysis for recomposition purposes. Also, as teachers and instructors write on a tablet computer or a touch screen input device a digital representation of the stroke or touch movements is created. The use by teachers of lecture support materials (e.g., computer applications such as slide presentations, spreadsheets, modeling applications and the like) directly from their computer is also automatically recorded and is subsequently embedded for playback with perfect fidelity and time-synchronized with the lesson audio and video tracks. The system then stores the processed lessons in compact and efficient format. Media content so acquired can also undergo analysis and editing, facilitating any subsequent lesson recomposition process for configurable viewing. Use of the disclosed system and methods minimizes the effort required by teachers to efficiently and completely capture their best performance of lectures. This system and method also makes it possible for educators to share these processed and transformed lessons with the widest possible number of students.

The capture functionality of the disclosed system and method provides the aforementioned improvements by assisting automation of the lecture recording process and also capturing the teacher demonstrative writing and use of blackboard, or even conventional chalkboards, among other writing tools, with maximum fidelity thereby supporting future playback with highest possible clarity.

While conventional computer programs can be used to view the captured lessons, a special viewing system is preferred to take greatest advantage of the captured performance information and to allow the greatest student control and interactivity with playback. The disclosed viewing subsystem enables students to pace themselves through reviewing the lecture and, when available, to personally manipulate either the live blackboard, a slide show, or Internet links, among other options, while proceeding at their own pace and for their own desired number of repetitions.

By way of summary, the disclosed technology implements a lesson capture and rendering method that uses at least one processor associated with a recording computer to perform the steps of:
  (a) capturing gesture information from a gestural sensing apparatus coupled to the recording computer, and storing in a recording computer memory gestural data that associates the gesture information to a reference frame associated with the gestural sensing apparatus;
  (b) extracting image information from a camera coupled to the recording computer and storing in a recording computer memory image data that associates the image information to a reference frame associated with the camera's field of view;
  (c) generating recording space calibration data that associates spatial coordinates within the field of view of the camera with spatial coordinates of the gestural sensing apparatus; and
  (d) sending the gestural data, image data and calibration data to a rendering computer.

The method further uses at least one processor associated with a rendering computer coupled to a display device to perform the steps of:
  (e) receiving the gestural data, image data and calibration data sent by the recording computer;
  (f) generating a calibration transform based on the calibration data that converts the gestural data and image data into a form usable by the display device to generate calibrated gestural data and calibrated image data;
  (g) using the calibrated gestural data to render a first visual image corresponding to the gestural information captured by the gestural sensing apparatus;
  (h) using the calibrated image data to generate a second visual image corresponding to the image information extracted from the camera; and
  (i) blending the first and second visual images to define a recomposed image made up of gesture information and image information that is then displayed on the display device.

DETAILED DESCRIPTION

The systems and methods described herein preferably employ programmed computers or programmed processor-based hardware to implement a classroom capture environment that allows teachers, instructors, and professors to automate recording their lessons and then reformat them into optimized electronic formats. If desired, the entire capture process can be performed by the teacher while in the actual classroom, by recording directly to the teacher's personal computing system or to an Internet based lesson server.

The technology works by separately capturing gesture information, image information and, if desired, application-specific event, environment and metadata information. Audio information is also captured. In many cases the audio is captured and integrated with the image information. These separately captured data are time synchronized to a common clock, such as the clock associated with a video capture.

Image information is derived from the raw data feed from a video camera. Image information may typically comprise video data from a video camera trained on the teacher during the lecture. The image information may then be processed to extract only the moving objects (principally the teacher). Background information such as the image of the writing board is excluded for reasons that will become apparent. It is frequently convenient to capture audio information, principally the teacher's voice, using the audio recording capabilities of the video camera system. In such cases, the audio information is automatically embedded in the video data feed.

Gesture information may include, for example, gestural stroke information captured by monitoring the teacher's writing implement in contact with a digitizing whiteboard or by monitoring touch data from a teacher-manipulated electronic tablet or touchpad. Gestural information can also be captured using motion sensors trained on or worn by the teacher.

Application-specific information may include, for example, an application-specific data file such as a spreadsheet file or slide presentation file, together with metadata identifying which field has been highlighted or which slide has been selected and further providing event data reflecting input keystrokes or pointing device movements as they are effected by the teacher in real time.

These separate information sources are time-synchronized by time-stamping the gestural and application-specific event data with a timestamp, which may be extracted from the video data stream. Spatial synchronization is separately handled. In this regard, the content authoring system capturing the teacher's lesson performance is spatially calibrated, so that coordinates, of the board (whiteboard, blackboard, chalkboard, etc.) can be referenced to the spatial coordinates as seen through the video camera's field of view. Thus through calibration the x,y position on the board is referenced to the x,y position seen through the video camera. Such calibration is performed, for example, by having the teacher or technician touch several predetermined known x,y locations on the board while the video camera observes this action in its field of view. In this way, the x,y positions with respect to the board's reference frame can be correlated to the x,y positions of the camera's reference frame.

In some applications where three-dimensional gestural input is used, it may also be necessary to calibrate in the third spatial dimension so that all three dimensions (x,y,z) are calibrated. A 3D camera system may be used in this instance. Alternatively, three-dimensional information can be inferred from a 2D camera by observing how known objects grow larger and smaller within the field of view of the camera as they move closer and farther from the camera.

In a presently preferred embodiment, the time-synchronized data captured from the gesture capturing system and video capturing systems, along with time-synchronized application-specific data, if utilized, are sent separately (each in its own native format) to the client system that controls the display or monitor viewed by the student. Calibration data for synchronizing spatial reference frames are also sent with the time-synchronized gesture and image data, preferably in a header that precedes the actual lesson performance data.

The client-side point-of-delivery system includes a display device or monitor upon which the lesson performance is displayed to the student(s). This point-of-delivery system or rendering system receives the calibration data from the authoring system or server and uses that calibration data to generate a set of spatial transformations used by the processor of the rendering system to translate spatial locations from the authoring system into spatial locations on the display device or monitor. The rendering system then processes the incoming time-synchronized gestural data and image data and application-specific data, if present, to generate different visual layers corresponding to the gestural, image and application-specific information.

The rendering system renders the gestural information to create a visually perceptible image of that being drawn on the teacher's board, tablet or touchpad, in real-time synchronization with the video image feed being rendered in a separate video layer. Application-specific information, including time-synchronized event data, are used by a processor associated with the rendering system to actually run or emulate the running of a native computer application corresponding to that used by the teacher. The application-specific information thus generates a third layer that runs or simulates the same computer application being operated by the teacher.

The authoring computer on the server side and the rendering computer on the client side may be in real-time communication with one another through a suitable networked connection or telecommunications connection. Alternatively, communication may be effected using an intermediary computer-readable memory. In the later case, the memory can be populated with data by the authoring computer. Then the populated memory can be optionally copied and physically delivered or made available to the rendering computer. For example, the memory could be a DVD recording medium or other non-volatile memory device. While physical delivery represents one way of transferring the recorded memory from authoring computer to rendering computer, an alternate approach copies the data from memory associated with the authoring computer and then transfers and stores the copied data in a separate memory associated with the rendering computer.

The gestural layer, image layer and optional application-specific layer are each generated or rendered in a common visually perceptible format adapted for display on the rendering computer display or monitor. All three layers are time-synchronized and spatially aligned so that the teacher's writing hand (rendered in the image layer) precisely matches the board writing as it is drawn (rendered in the gestural layer). If the teacher touches a hyperlink or hotspot rendered by the computer application, the image layer shows the teacher's finger make contact with the hyperlink or hotspot as the application-specific layer responds to the touching event, causing the controlled computer application to respond as programmed.

The rendering system takes these two (or three) layers and blends them to define a recomposed image made up of combined gestural information, image information and application-specific information (if present). Rendering can be effected in a variety of different ways, which in some embodiments the user can alternatively select.

To simulate the teacher standing in front of the chalkboard while lecturing, the gestural layer and application-specific layers are layered first, followed by the image layer, so that the image layer lies on top. Because the image layer contains only moving object information (principally the teacher) overlaying the teacher's image on top of the rendered gestural layer allows the generated "writing" on the board to be seen clearly, except when the teacher happens to be standing in front of a particular portion of the board. Thus this layered blending simulates what the student would see when viewing a conventional video data feed with several important exceptions. First, the resolution of the writing or writing quality is much higher than a video feed, because it was generated synthetically by rendering the gestural data, Second, the resolution and performance quality of any application-specific data is also of much higher quality, because the application doing the rendering is running on the point-of-delivery or client side. Third, if desired the students can temporarily "turn off" viewing of the teacher, to allow them to see the entire writing board unblocked by the teacher's body.

While the classic teacher-in-front-of-the-chalkboard view is expected to be popular, the rendering system can blend the visual layers in other ways to achieve different views. One such view is the teacher-behind-glass view, where a glass pane stands between teacher and students. The teacher draws on the glass and the students can see what has been drawn, superimposed on the image of the teacher. This view is composed by placing the image layer first and then placing the gestural layer above it. To conform to the left-right sense of the video image either the video image or the gestural image may need to be reversed 180 left-to-right depending on how the data was captured by the authoring system, In this view the image data can be modified to include both moving objects (teacher) and video background if desired.

The technology allows this teacher-behind-glass view to have features not possible in conventional video recording. For example, by flipping the image layer 180 degrees about the vertical axis, but keeping the gestural layer unchanged, the teacher's writing direction is reversed so that words written on the simulated glass screen will appear in left-to-right order by the viewing students.

A third view places the gestural layer on top of the image layer and/or application-specific layer, where the gestural layer is derived from a tablet or touchpad not physically present in the video camera field of view. The teacher might be explaining, for example, how to interpret a periodic table of the elements, using his or her finger on a tablet computer to trace out relationships among various chemical elements. The student would see a periodic table, rendered from application-specific data, with the teacher's gestures drawing lines on the image of the rendered table.

The preceding examples have featured two-dimensional rendered displays. By including a third dimension some interesting possibilities arise. For example, the teacher, captured using a 3D camera system, may hold out his or her hand to manipulate a synthetically rendered three-dimensional object. The object would be rendered using a suitable computer application, such as a 3D modeling application that allows the teacher to rotate and turn the modeled "object" as if he or she were holding a physical object. The teacher could then demonstrate how to dismantle or dissect the modeled "object" in virtual space by manipulating the underlying 3D modeling application.

Figure 10:
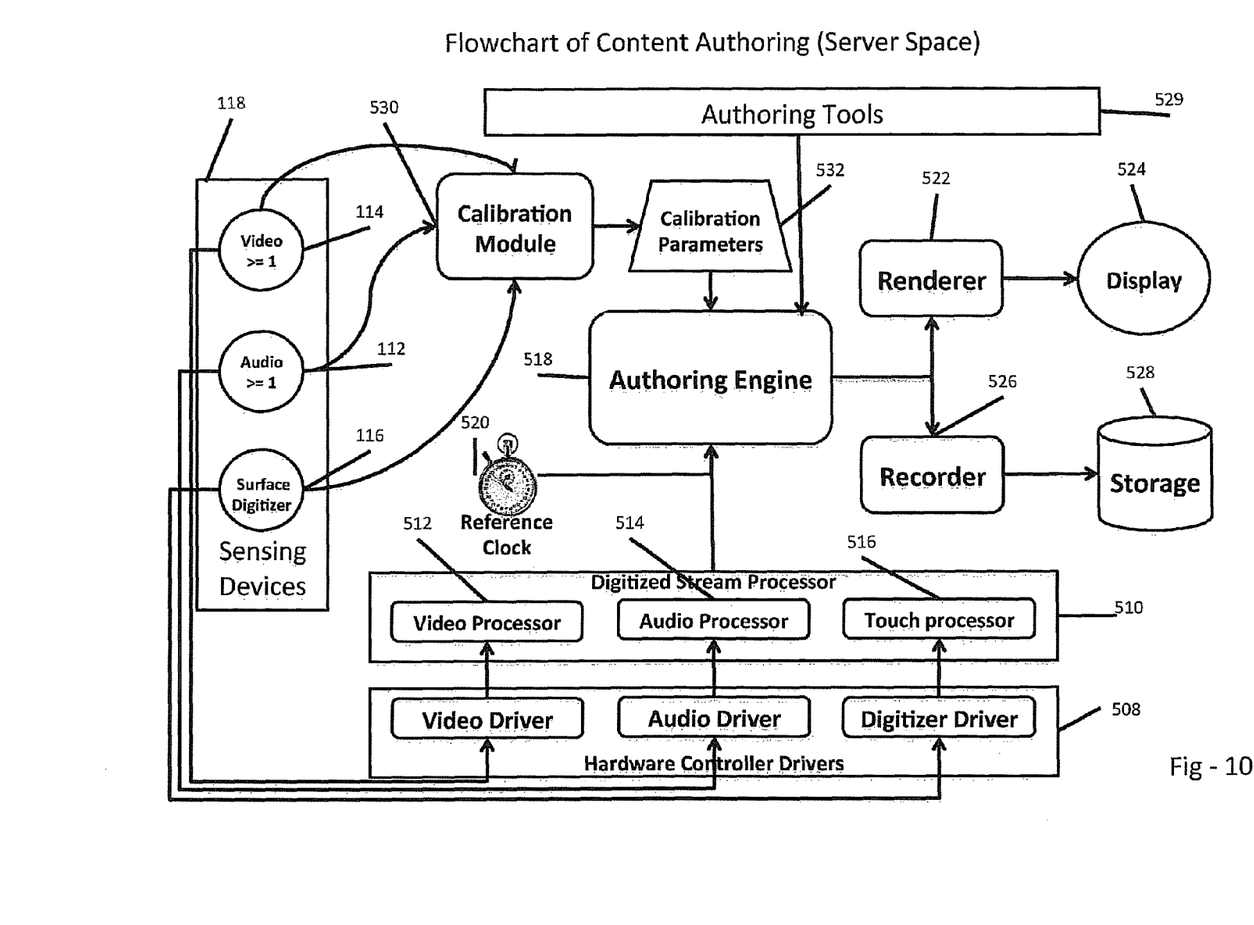
FIG. 10 is a flowchart of content authoring (server space).

FIG. 10 depicts one presently preferred embodiment of a content authoring system in accordance with the foregoing teachings. The sensing devices 118, video recording hardware 114, audio recording hardware 112 and surface digitizing hardware 116, are each coupled to their respective hardware controller drivers 508. Depending on the implementation desired, the video recording hardware 502 may comprise a 2D recording system (e.g., 1 video camera), a 3D recording system (e.g., 2 stereoscopic cameras) or holographic recording (laser cameras). The audio recording hardware may comprise a single microphone (for low noise environments) or plural microphones (for high noise environments where noise cancellation is needed). The surface digitizer may comprise a touchscreen monitor, a digitizing tablet, an iPad, or the like.

Each input source is coupled to a corresponding digitized stream processor, shown at 510. The video processor 512 may be programmed to implement chroma correction and/or gesture recognition algorithms. The audio processor 514 may be programmed to perform noise cancellation and/or audio enhancement. The touch processor 516 may be programmed to perform sample smoothing and/or rate control.

As depicted, these processed digitized streams are fed to the authoring engine 518, which has an associated reference clock 520. The authoring engine provides two basic functions, that of rendering 522 the input streams for display 524 and that of recording 526 the input streams to storage 528.

The authoring engine 518 is preferably designed to interface with a set of authoring tools 529 that provide capabilities to author content recorded as part of user gestures. Examples include:

Start recording, end recording
Change stroke parameters, i.e. color, width, style
Draw shapes, i.e. circle, triangle, parametric from an equation
Load backgrounds, i.e grid, plain, colored, line
Load auxiliary media, i.e. images, video, audio, 3D models Also coupled to the authoring engine is a calibration module 530 that receives reference data from the camera system, audio system and surface digitizer system to capture and generate a set of calibration parameters used to spatially synchronize the respective data streams as discussed above. In this regard, often an audio signal, such as a loud handclap at the beginning of a recording session can be used to time-reference the beginning of a teaching session being captured by multiple cameras. Such synchronization allows the audio to be lip-synched with the video feed for a more natural playback experience.

Storage 528 may be configured to store the respective streams either as interleaved data or non-interleaved data representing the video stream, the gesture stream and the calibration data (each in either compressed or uncompressed format). While implementation details may differ, the following presents an exemplary data structure used to organize, store and transmit the respective digitized streams:

Video
Field of view
Pixel Resolution
Frame rate
Color per Pixels and Color depth
Audio
Sample per second
Sample resolution
Digitizer
Samples per second
Pressure resolution
Pixel Resolution
Reference digitizer (0,0) and (Max_X, Max_Y) in Field of View of Video
Gesture
beginRecording(Time=t1) where Time can be referenced to (00:00:00:00)
loadBackground(Grid=10, Time=t2)
selectPen(Width=2, Time=t3)
startOfStroke(Time=t4)
[x1,y1][x2,y2][x3,y3] . . .
endOfStroke(Time=t5)
loadPicture(Picture=XYZ, Time=t6)
zoomStart(Time=t7)
zoomEnd(Time=t8)
loadInteractiveVideo(InteractiveVideo=v, Time=t9)
startInteractiveView(Time=t10)
startOfStroke(Time=t11)
[x1,y2][x2,y2][x3,y3] . . .
endOfStroke(Time=t12)
pauseInteractiveVideo(Time=t13)
endRecording(Time=t14)

Figure 11:
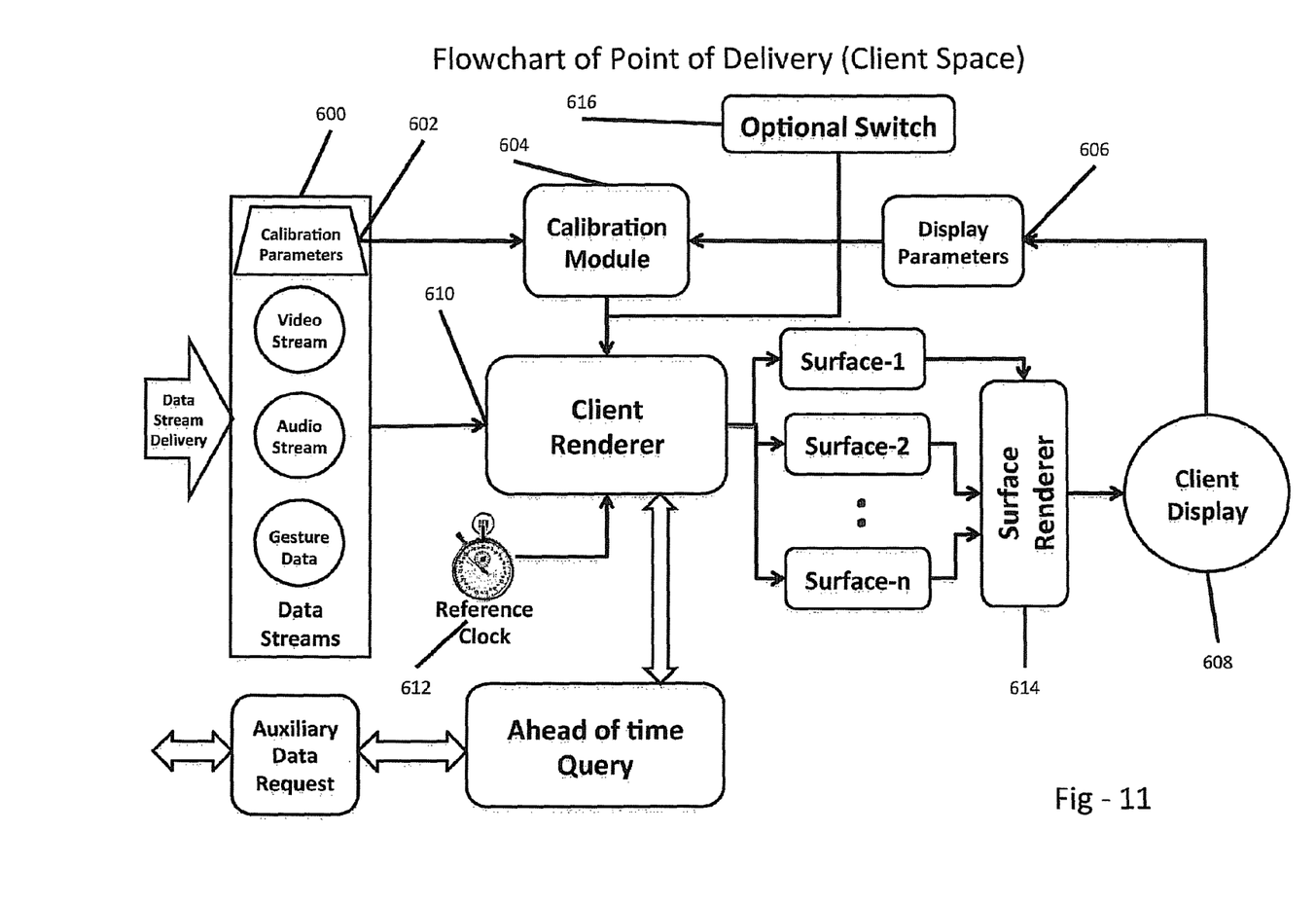
FIG. 11 is a flowchart of point of delivery (client space).

FIG. 11 shows the corresponding point-of-delivery system or rendering computer system operating in the client space. The incoming data streams plus calibration data are received at 600. The calibration parameters 602 are fed to the calibration module 604 which operates by programming a processor associated with the rendering computer to create a translation table or mapping algorithm that adapts the calibration parameters 602 from the server space into parameter useable by the display or monitor 608. This is done by reading pre-stored display parameters 606 associated with the display 608 and mapping the calibration parameters 602 into the client space, taking into account the pixel resolution and aspect ratio of the display 608. The calibration module 604 then feeds the generated translation table or mapping algorithm parameters to the client renderer 610, which then generates the viewable layers (surface-1, surface-2, surface-n) from the incoming data streams using its own reference clock 612 to enforce client side synchronization.

The point-of-delivery system further includes a surface renderer 614 that layers the respective viewable layers (surfaces) in the order defined by the desired presentation (e.g., teacher in front of chalkboard, teacher behind glass, etc.). The client renderer 610 specifies the rendering order by the manner in which the individual layers (surfaces) are organized. For example, surface-1 is layered first, followed by surface-2, and so forth. The client renderer selects the rendering order based on preprogrammed instructions, which may include input from an optional switch 616 operated by the student to select the rendering presentation desired.

Additional Embodiments and Use Case Examples

Figure 1:
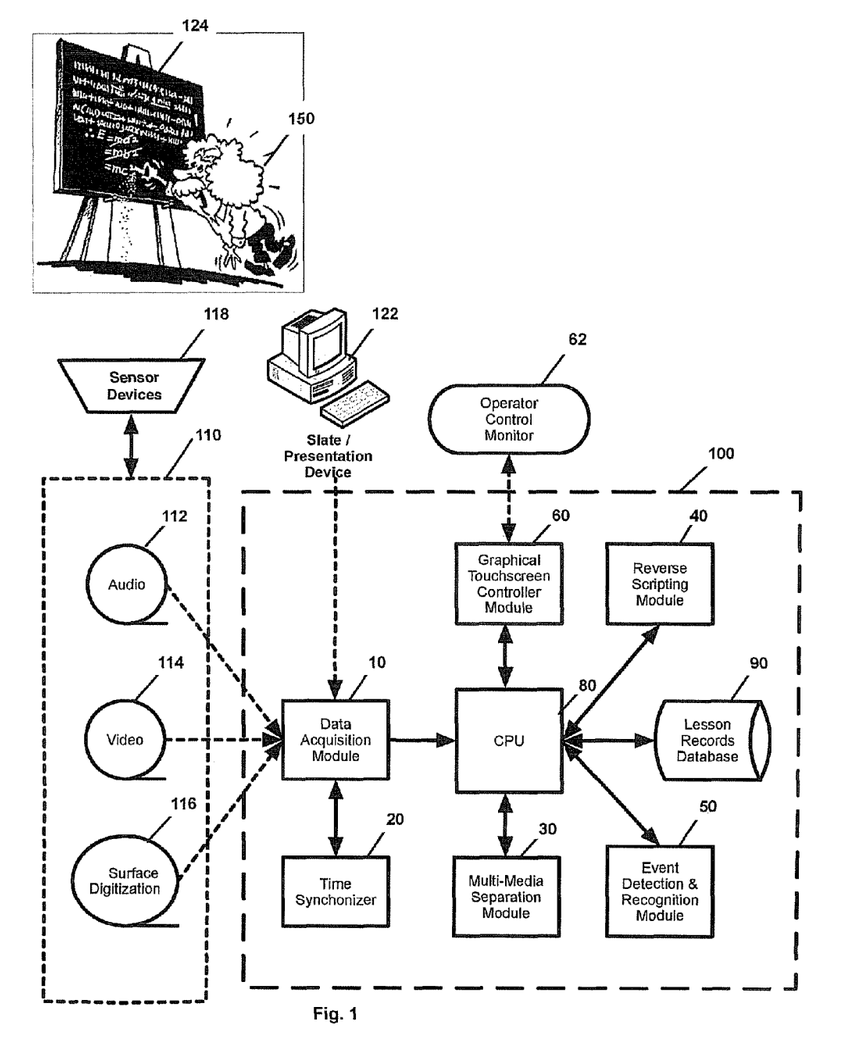
FIG. 1 is a block diagram illustrating a performance capture and lesson composer subsystem to automate the acquisition of teacher lectures into a lesson records database, according to various aspects of the present disclosure.

As shown in FIG. 1, an exemplary system implementing the new methodology may include: data acquisition module 10, time synchronizer module 20, event detection module 50, multi-media separation module 30, reverse scripting module 40, central processing unit 80, graphical controller module 60, and lesson records database 90. Also, if desired the system can further include a lesson effectiveness test and ratings module, shown in FIG. 2, which includes student progress database 70, and problem set database 74.

In one embodiment of the lesson capture functionality, any body motions by the teacher giving a lecture are captured in video format. The speech and other sounds involved in the lecture are captured in one or more audio tracks. The writing of the teacher on a touch screen computer or a tablet computer based device is captured in vector format or other loss less representation. Likewise the steps of the teacher in executing steps on a computer including mouse movements, for example, are captured and stored as part of the summary of the commands and steps of the lesson in the reverse scripting process. In other variations, the motions and gestures of the instructor in controlling the lecture materials and associated tools are captured in real-time as descriptive commands using video analysis and advanced recognition computer vision or body tracking software algorithms.

Because the performance is captured in this fashion, for example when a lesson is created, a student can use the viewer subsystem to playback the most accurate possible recording of all the details of the lesson. The viewer subsystem allows the student to not only playback the lecture audio and video but additionally follow the supplementary sequences, which are perfectly synchronized with the audio and video of the lesson. These supplementary materials are those, which take place on a blackboard, tablet computer, digitizing tablet, or laptop computer among others. The playback version either includes identical versions of files or even software that the instructor used in giving the lecture. The viewer subsystem can also include a student database and student history module that automatically makes a record of the progress of that student in viewing the lesson materials.

The system essentially implements an eight step process with the main parties participating being students, teachers or instructors, and class administrators. The steps of the method consist of (1) set up of acquisition equipment and performance capture subsystem, (2) capture of performance of the teachers lessons or lectures in multi-media formats which permit the subsequent processing, (3) automated processing of the instructor or teacher recordings to separate out the distinct information channels for efficiency of presentation, storage, analysis, and concentration of didactic effectiveness, (4) automated reverse scripting of the performance with time synchronization information between media formats, supplementary programs and supportive materials, (5) student registration and preference setting to set personal configuration, (6) student review of the lessons with efficiency pre-maximized for each playback environment but with governed by the reconfigurable display preferences, (7) integrated review checks to assess student synthesis of information, and (8) automated analysis of student progress and lesson effectiveness for review, as governed by permission settings, by students, parents, instructors and class administrators.

FIG. 1 is a block diagram illustrating a performance capture and lesson composer subsystem to automate the acquisition of teacher or instructor lectures into a lesson recordings database, according to various aspects of the present disclosure. The arrows in FIG. 1 show flow of communications between the main system modules.

The parties participating in acquisition of recordings, as shown in FIG. 1, include teachers, instructors, and professors 150 among others. One or more video cameras and microphones are set up to have proper position and orientation to capture the visual and audio of the teacher giving the lecture. Multiple video recording devices 118 may be employed in order to permit each unit to zoom in on a particular aspect of the lecture. For example, the first video camcorder may be used to focus on the body movements of the teacher. The second camcorder or video camera may be used to focus on the head of the teacher in order to best record their facial expressions. A third device may track the arm and hand of the teacher and be used to capture to their writing on the blackboard or use of some other writing implement. As shown in FIG. 1 the capture of the writing process may alternatively be performed by a slate or writing digitization device 122, which directly captures the writing signal. The data acquisition module 10 combines signals from one or more video cameras 118 in order to capture audio 112 of the lesson including speech audio, noise audio, and background sounds audio among others; video 114 of the lesson including teacher video and including teacher facial expression, body torso movements, and arm and hand video among others; and slate digitization 116 or capture of the blackboard video process of the teacher writing.

As shown in FIG. 1, the data acquisition module 10 collects and combines the signals from the aforementioned recorders. The time synchronizer module 20 ensures that the signals from multiple channels are captured with the time stamps necessary to allow the processing of the signals and their later recombination with synchrony of events. The graphical controller module allows the system operator to initiate recording as well as pause, monitor and review while overseeing the process via the operator control monitor 130. The CPU 80 stores the captured and synchronized media channels along with any operator entered annotations in the teacher recordings database, which contains either the actual data or compressed versions of the raw lesson media files. Before storage the multi-media separation module 30 processes the media tracks and uses video and audio algorithms to separate out the various tracks into various video tracks such as teacher face, body, and arm and hand movements, and writing on blackboard among others, audio tracks including teacher voice and other performance related sounds among others, and output information directly from a teacher controlled presentation device.

The event detection and recognition module 50 identifies the action events of the teacher which result in changes in the slate presentation device 122 or the slate digitization 116 and then a summary description of the events is recorded by the reverse scripting module 40. The complete script of the performance or teachers lesson is then stored along with the captured media in the lesson records database 90.

The lesson composer subsystem, automates the analysis of teacher recordings of diverse lesson media for subsequent recomposition and didactic concentration. The lesson composer subsystem processes as its input the media files in the teacher recordings databases which contain the time stamp information necessary for media synchronization. The CPU 80 works in concert with the various analysis modules, which perform the automated analysis of the teacher recordings. These perform event detection expert and recognition algorithms 50 identifies the time points in the lesson which contain the most essential recording sequences and then isolates the various channels of information using the multi-media separation module 30. The reverse scripting module 40 captures the teacher actions in a script which permits the process of combining the segments, which have been isolated. The various media tracks are stored in the lesson records database 90. Stored along with the media is the timing information, which allows playback subsystem to automatically highlight the concentrated lessons.

Figure 2:
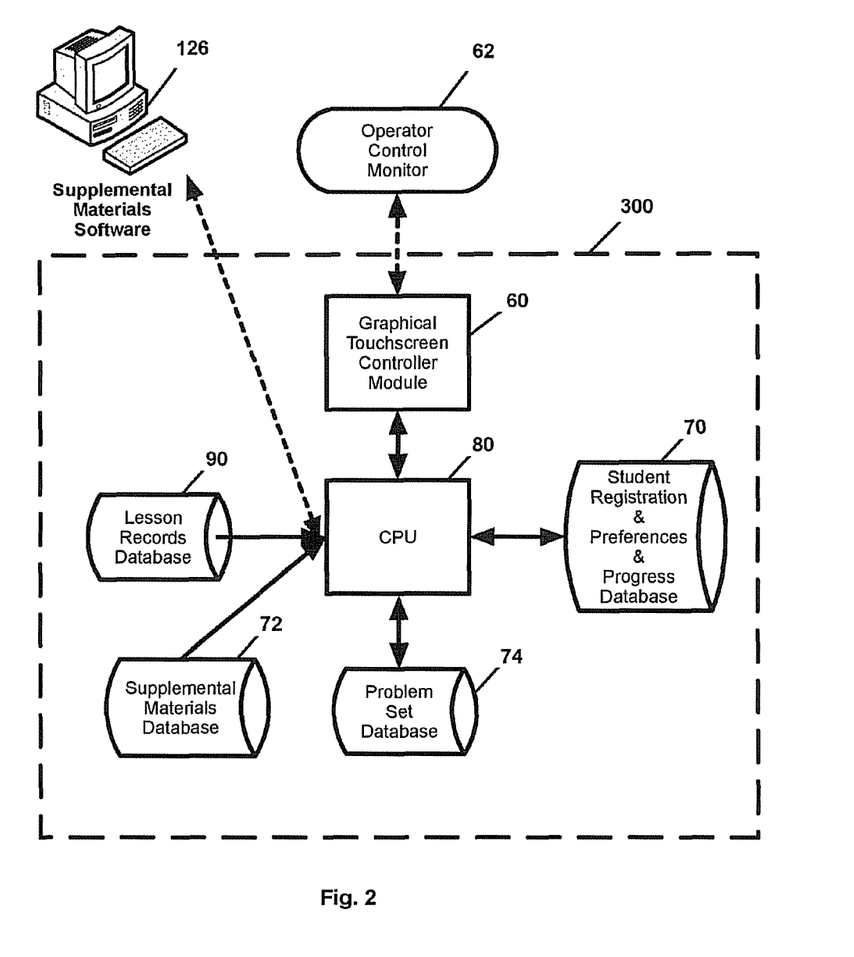
FIG. 2 is a block diagram illustrating a lesson viewer and progress measurement subsystem to enable students to utilize the optimized entries in the lesson records database, according to various aspects of the present disclosure.

FIG. 2 is a block diagram illustrating a lesson viewer and progress measurement subsystem to enable students to utilize the optimized lessons, according to various aspects of the present disclosure. The lesson viewer and progress measurement subsystem 300 takes as input the lesson records database 90 of concentrated didactic content and also uses the student configuration data contained in the student progress database 70 to present the lesson that the particular student is ready for in their course work. Depending on the student preference information in the student progress database 70 it may indicate for example that the student has a particular handicap such as sight or vision impairment. In this situation, the CPU 80 would use the configuration and preference information to playback the desired lesson with the appropriate adjustments. For example, a deaf student would get playback with sign language and text replacing the usual audio channels.

At regulated points in the progress of the student, the CPU 80 would determine that the student is ready to demonstrate their mastery of the material newly covered. Problems and questions are likewise designed to be efficient and can even use the same accommodation capabilities to allow a student with handicaps to respond to questions in alternative fashions for assessment.

The functionality of the lesson viewer 300 shown in FIG. 2 can either be contained in a local computer, which may or may not be identical to the computer, which performs the functions shown in FIGS. 1 and 2. Alternatively, the lesson viewer 300 functionality can be accessed remotely by use of a remote computer running supplemental materials software 126, which accesses the lesson and student databases and lesson viewer technology through the Internet.

Figure 3:
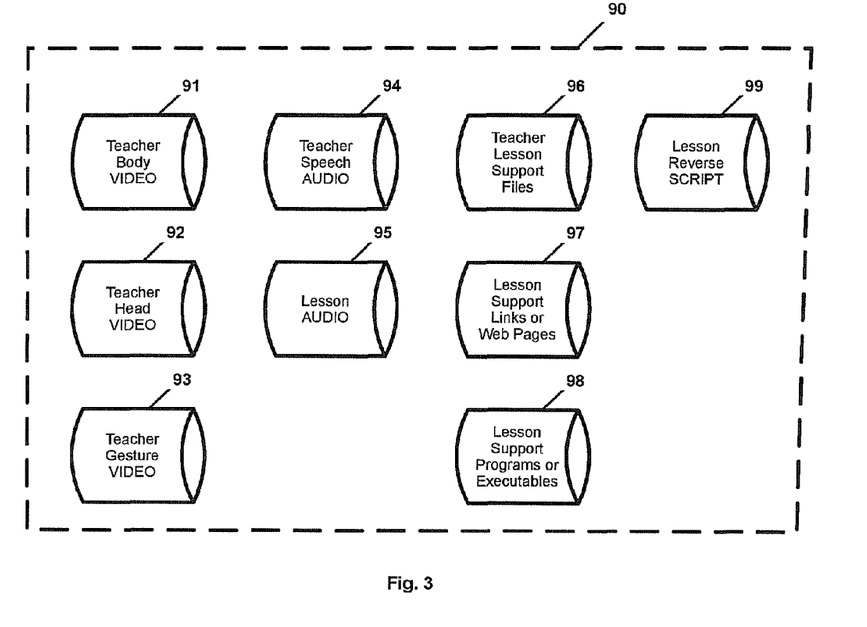
FIG. 3 is a diagram illustrating the lesson records database and supportive databases that are contained within and comprise the overall database that are collected or created upon lesson capture and that are displayed upon lesson viewing by a student for improved learning experience.

FIG. 3 is a diagram illustrating the supportive databases that are contained within and comprise the overall lesson records database 90 that are collected or created by the described lesson capture process. These databases all include accurate time stamp information, which is used to allow simultaneous display of any subset or combination of these aspects of the performance for playback, analysis or review. The lesson reverse script database 99 contains the summary information of all the physical actions by the teacher that are used to regenerate in a loss-less fashion the writing for example of the teacher on the blackboard. In this case, the strokes the teacher uses to write on the board are represented as vector commands along with timing information for the strokes.

Also as shown in FIG. 3, the lesson records database 90 contains the various video and audio tracks of the performance as isolated and time synchronized by the capture process. The support files 96, which are provided by the teacher and loaded on the slate or presentation device 122 prior to performance are captured during performance along with the commands, keystrokes, mouse movements, and gestures. Among the other teacher actions, which are captured by the reverse scripting module 40 are references to the associated files and programs that the teacher employs during the lesson these may be stored in the lesson support links or web pages database 97 or the lesson support programs or executables database 98. For example, the teacher may have loaded a Powerpoint file on the presentation device 122. The actual Powerpoint file or the images from the file are entered automatically into the teacher lesson support files database 96 of the lesson records database 90. If for example, the teacher used the presentation device 122 to navigate to a web page during the lesson, the link for the site is stored or the actual web site itself is downloaded and stored in the lesson support links or web pages database 97.

If, for example, the teacher executes a program such as Autocad then the screens and actions, which are part of the lesson, are captured within the lesson support programs or executables database 98. As opposed to strictly screen captures this database can contain the program executable itself and the commands necessary to recreate the teacher actions.

The lesson reverse script database 99 contains the complete orchestration or script to sequence the events from the other component databases in perfect synchrony to recreate the original lesson. Likewise this database contains the vector and timing information necessary to recreate any hand, chalk, marker, or pen motions, to make writing on a display device, or gestures used by the teacher for example to control execution of a program. By following the script these teacher actions can be recreated and the original writing of the teacher can be perfectly duplicated in time and displayed not using video but essentially exact reproduction or recreation using vector description commands which can be scaled to accommodate any display device with equivalent clarity and with most compact form or efficient use of storage space.

Figure 4:
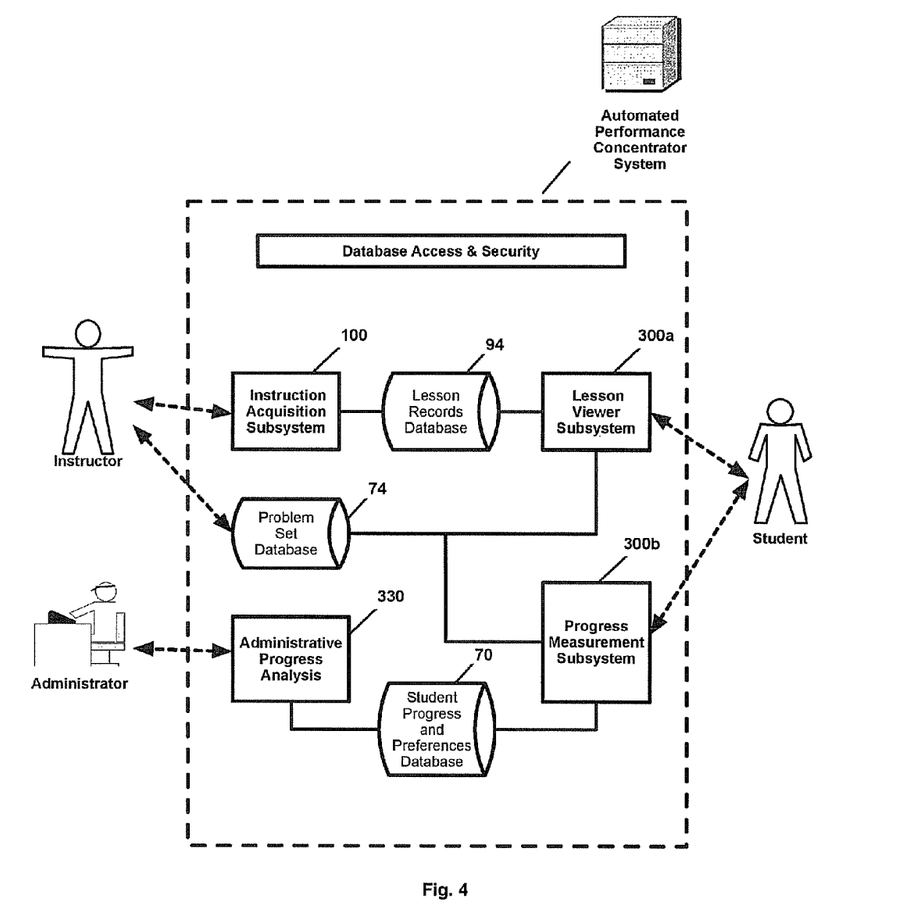
FIG. 4 is a high level diagram illustrating an exemplary process flow for usage of the system to acquire multi-media teacher data, for usage of the system by a student for improved learning experience, and for review by an administrator to measure student progress and lesson effectiveness within a school learning environment according to various aspects of the present disclosure.

In one embodiment a server-based system acts as a portal and integrator to all key lesson providers, educational administrators, and students, with all necessary functions. Various embodiments of the method may not include all of the participants shown in this figure, or alternative system layouts may be developed which provide special interfaces or features for certain participants. But the general software modules can be adapted to accommodate for these special features. As shown in FIG. 4, the central server is accessed though the Internet by individual teachers and instructors, or they can alternatively access lesson creation tools through a local server. Also as shown in FIG. 4, all students via their home computers can connect to the central system server to execute the backend course content and student results databases. Alternatively, lessons can be downloaded and run on the students personal computer, laptop, or tablet using a standalone version of the lesson viewing and progress measurement software. Finally, administrators can connect to the computer framework in order to implement their student body assessment and monitoring.

While FIG. 4 depicts the lesson acquisition process such that the data flows directly from the sensors to the performance capture and lesson composer subsystem 100, which creates the teacher recordings databases and lesson records database 90 etc. In other embodiments, the system could be distributed in both time and space. I.e. the teacher performance data could be acquired and stored in one location and then at a later time communicated to the lesson composer subsystem running on another computer or location or the central server. Likewise the other subsystems, which comprised the full functional set can be distributed in disparate locations on distinct computing units.

Figure 5:
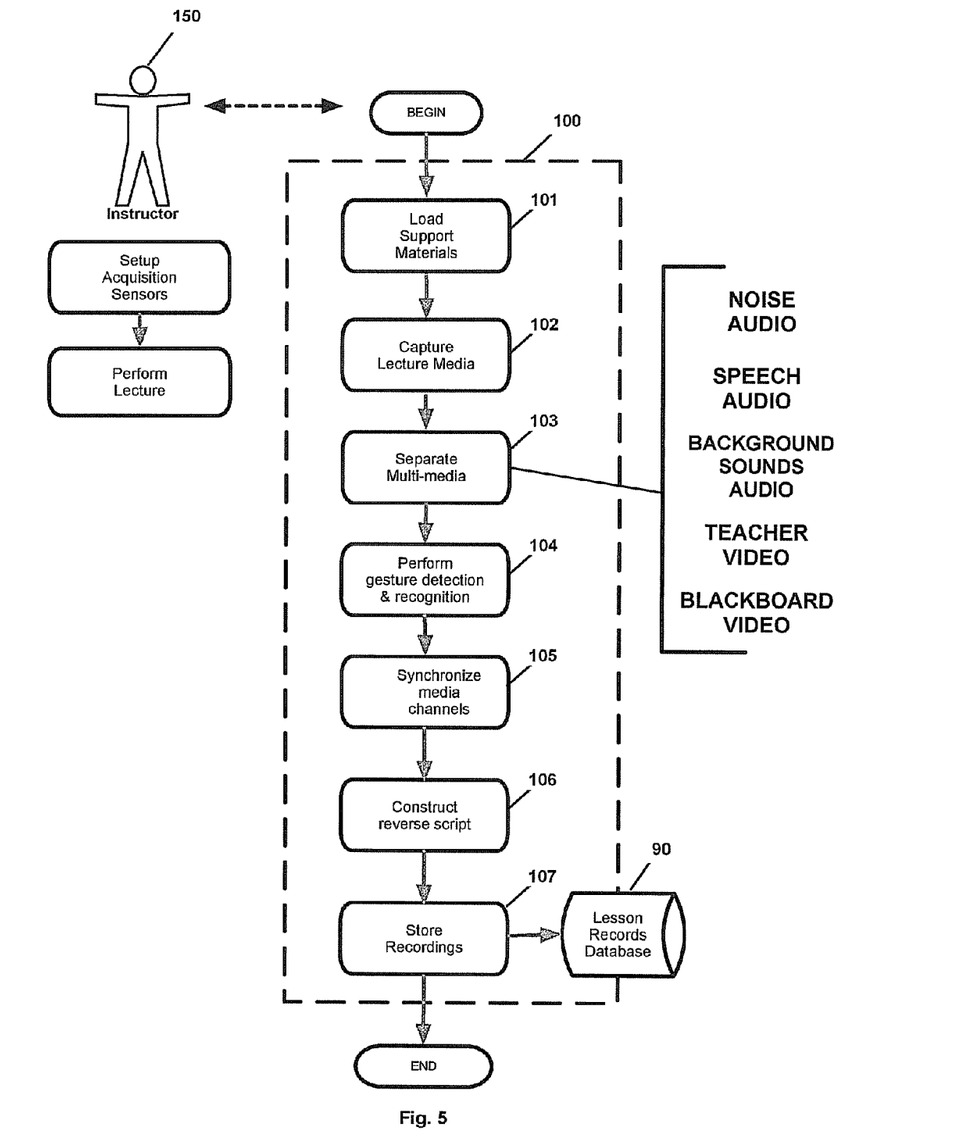
FIG. 5 is a high level diagram illustrating an exemplary process flow for usage of the system to capture multi-media teacher data for performance concentration and storage in a lesson database according to various aspects of the present disclosure.

Shown in FIG. 5 is the process for creation of the special concentrated performance records by the instructor or teacher. The instructor first sets up the video recording cameras and audio recorders or microphones or other sensor devices and focuses them to cover the area of the room over which the instructor will range. The instructor then loads all their files to be used in the lecture on the computer system. Alternatively the system software could all be loaded on the teacher's computer. In either alternative, the system when activated controls the data acquisition of the sensor devices and the processing of the data into the lesson records database 90.

As the instructor gives the performance, the system captures the lecture media including video, audio, computer interactions, writing on chalkboards etc. The various media channels are separated out automatically from the video stream and time stamp information is added to each media channel to support synchronization for playback. The event detection and recognition algorithms are executed to which automatically perform simultaneous detection in the recording channels of didactic events and place appropriate annotation or record of the event in the reverse script. As events are recognized such as writing on board, or opening of a web page, these events are recorded with the information necessary to recreate them in the reverse script file. The reverse script along with the time stamped distinct media channels give a complete and definition of the lesson for future recreation with maximum definition and minimum size. The media files and reverse script database are all stored as a complete lesson in the lesson records database 90.

Figure 6:
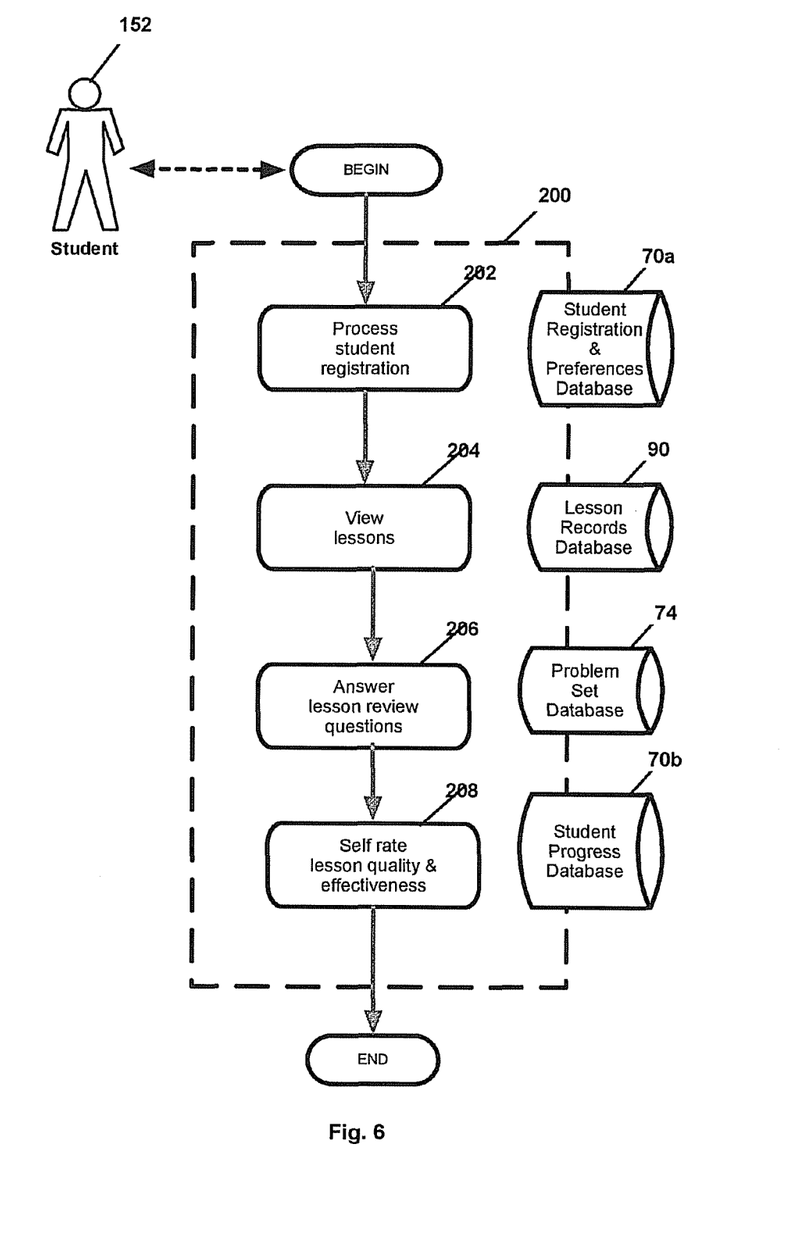
FIG. 6 shows a representative flowchart for student review of materials, evaluation of their mastery of a new lesson, and posting of comments and questions as part of the execution of the internet based software in accordance with an embodiment of the present invention.

FIG. 6 shows the student process the student follows in using the optimized lessons using the viewing subsystem of the overall system. The first time the student uses the system they performs a registration process. In the future, once the student using the lesson viewer 300 is identified, the CPU 80 checks the student database 70a for the preferences for lesson display options and also for accommodations. The student views the lessons at their own pace and in maximum resolution and clarity because of the capture and playback of the teacher writing in vector format and also because of the optimized recording of both the facial expression and body movements of the teacher they can be reproduced with improved fidelity over straight video recording. The lesson completion and test result information contained in the progress information database 70b is used to select the correct lesson for display and the appropriate test and review questions from the problem set database 74 so that the understanding of the student and their level of understanding are properly evaluated.

At the same time the lesson effectiveness is effectively scored because over time if the student population has relative problems with the review questions it is a reflection on the lesson effectiveness. After the lesson is completed, the student has the ability provide direct evaluation of the lesson with a ratings system which allows indication of their personal judgment how effective, enjoyable, or informative they feel the lesson was on a easy to use ratings questionnaire presented by the lesson effectiveness test and ratings module.

Figure 7:
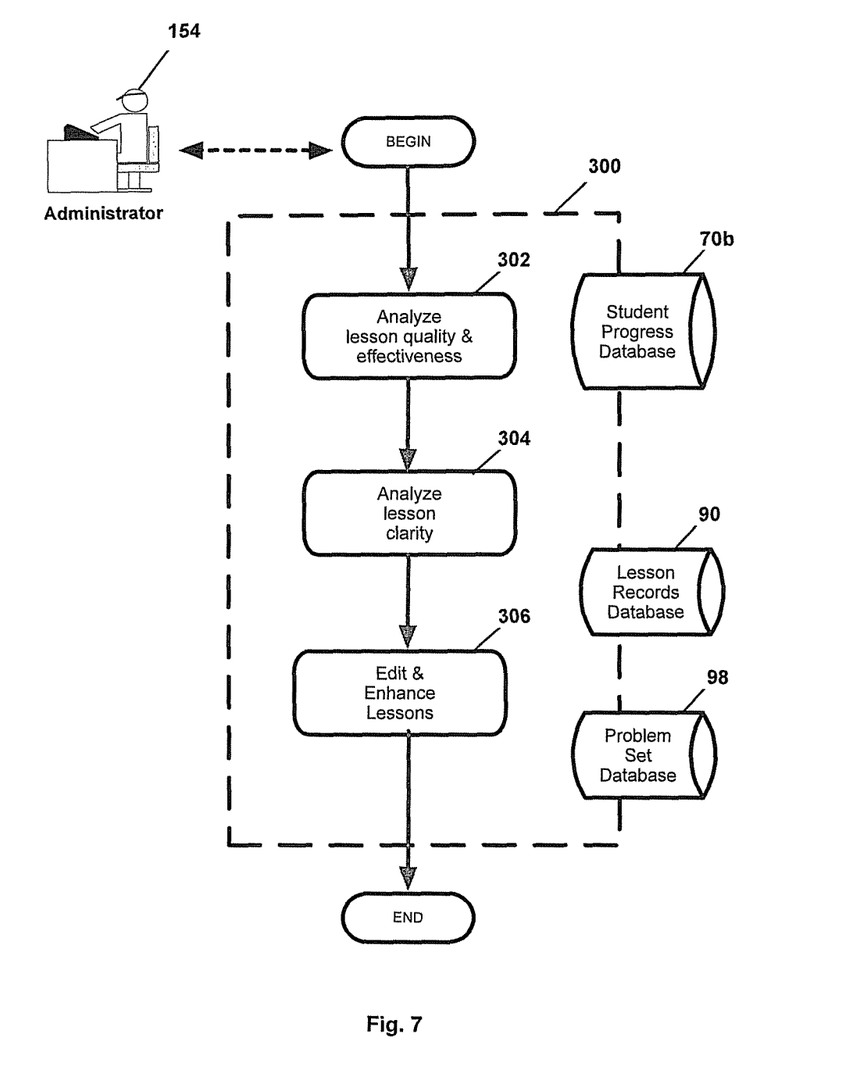
FIG. 7 shows representative flowchart for teachers or school administrators for reviewing individual student and class performance progress using the system in accordance with an embodiment of the present invention.

FIG. 7 shows the interaction of the school administrator, teacher, instructor or course designer with the system. The administrator can analyze the lesson quality and effectiveness by comparing the ability of the population of students to master the lesson material when compared to lessons of theoretically comparable difficulty. Statistical analysis of the performance of student with respect to their own progress history and relative to other students and other classes will allow objective evaluation of the effectiveness of the particular lesson.

The student subjective evaluation information can be used to double check the results of the objective analysis and provide explanation for the statistical results. Then the administrator and teacher can work to edit and enhance the lessons if areas for improvement are identified. For example if students say they need a particular segment of the lesson clarified then and especially if review results indicate a relatively low effectiveness of this segment the teacher can add additional supplementary materials to the lesson the additional explanation can be added to the teacher lesson support file database 96, the lesson support links or web pages database 97, or the lesson support programs or executables 98. Alternatively the teacher could record and additional segment of performance which could be inserted into the lesson at any time point.

Figure 8A:
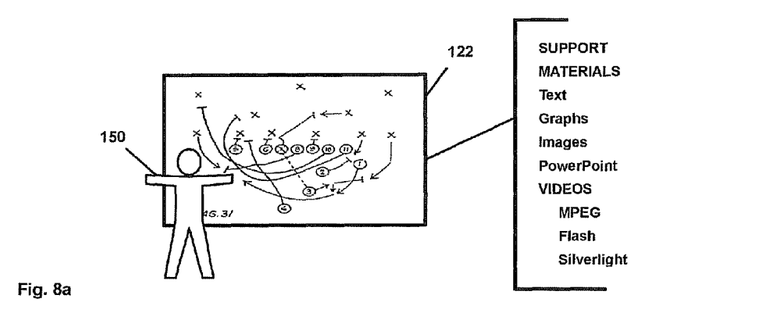
FIG. 8*a* shows of usage of the system with a football coach instructing the team regarding football plays using support material in this case of a drawing program which converts the drawing movements of the coach into strokes on the display.

FIG. 8*a* shows usage of the system for the case of a football coach or instructor addressing the team regarding football plays using support materials in this case consisting of files and a graphics program which converts the drawing movements of the coach into lines or custom geometric patterns on the display 122. As shown in FIG. 8*a* the support material could consist of members of the full selection of possibilities of computer displayable files in including test, graphs, images, Powerpoint presentations, or videos including mpeg, Flash, and Silverlight formats among others.

Figure 8B:
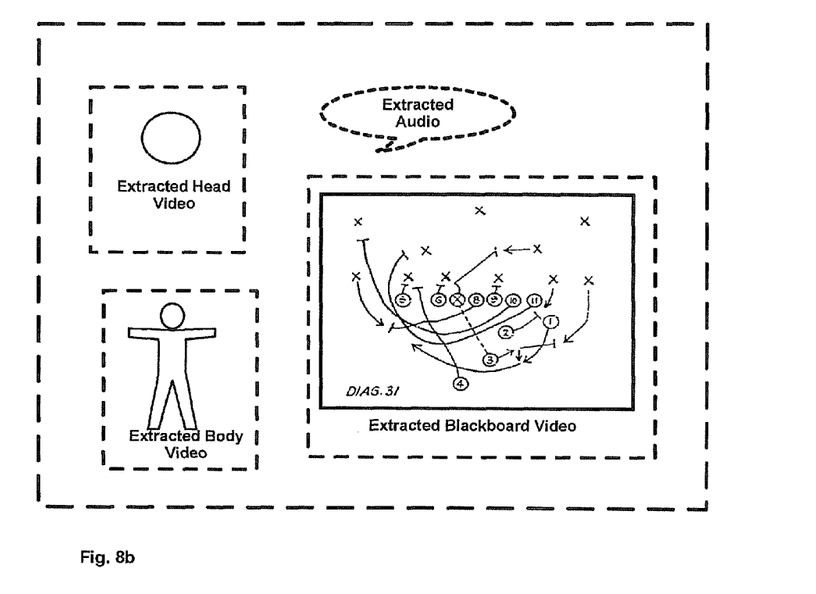
FIG. 8*b* shows a representative screen layout for viewing of the captured coaching session according to the performance capture process and other various aspects of the present disclosure.

FIG. 8*b* shows a representative screen layout for viewing by students or team members following capture of the coaching session according to the performance capture process and other various aspects of the present disclosure. Screen layouts are configurable by setting of viewer preferences and as shown in the figure includes video of the body of the coach as the team talk was given, and a zoomed view of the head of the coach allowing for better visualization of the facial features and expressions of the coach. This zoomed video will help eliminate ambiguity inherent in listening to the audio track of the verbal enunciations of the coach.

The extracted audio is depicted as being visually shown on the screen. The audio track is played in synchrony with the visual display and there may or may not be an associated graphical component to the audio track. Graphics for the audio can range from volume and speed controls including pause, rewind, and fast forward, the current time within the recording along with the total time of lesson, and potentially even a transcription from speech to text with highlight of the current location similar to subtitles for a foreign movie or even live opera productions with synchronized projected libretto.

The extracted blackboard video is the recording of the hand gestures to the vectorized and digitized animation of the writing or gestures overlaid onto the appropriate background. The controls described above for the audio could be used to control the extracted video as well as the video and audio are perfectly synchronized so that ambiguities are eliminated in terms of what the instructor or coaches writing corresponds to in terms of verbal explanation.

Figure 9:
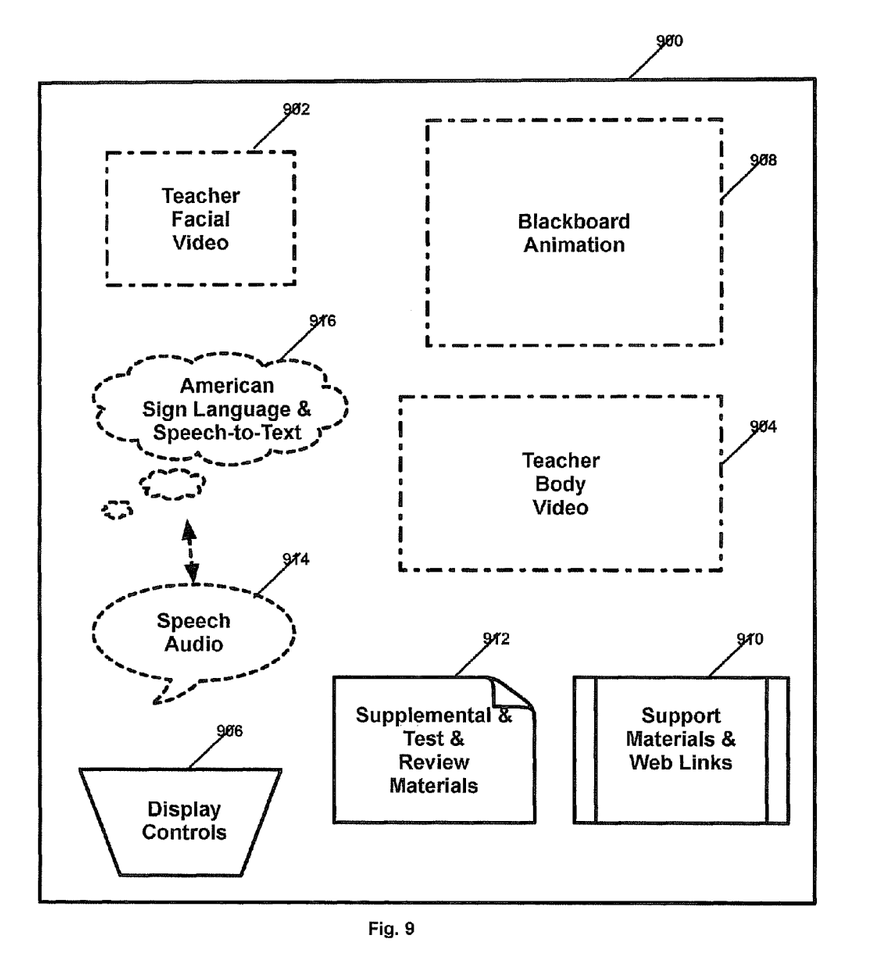
FIG. 9 is a representative layout for a user configurable screen as part of the student viewing of lessons in accordance with an embodiment of the present invention.

FIG. 9 shows a more detailed representative layout or a more elaborate embodiment than that shown in FIG. 8*b*. FIG. 9 shows a representative layout for a user configurable screen as part of the student viewing of lessons using the lesson viewer subsystem 300. The user preferences can be used to control the default layout of each window on the screen, the relative position and size. Each window can also be resized and repositioned by the student during the lecture and the display controls used to control the pace of the playback including pause and rewind as on a standard video player. What is especially advantageous of this disclosure is the isolation of the teacher facial video from the body video allows the maximum clarity of the facial expression and speech, which has been shown to improve the effectiveness of the teachers communication. The animation of the blackboard writing not only optimizes the storage efficiency of the lessons but improves the clarity of the image. The animation in vector format improves the quality of the image over video of a blackboard which can be hard to read.

The automatic appearance on the screen of the links and supplemental materials allows the students to immediately resolve any confusion that might arise as they listen and view the lecture. In this case the links are live and the supplemental materials are as provided by the teacher, administrators and if so configured by the lesson creator can be added to by student viewers to assist their peers.

The speech to text conversion and configurable display of this transcribed information to provide the written text of the teachers narration is another feature of the system to aid the student comprehension. For example the pronunciation by a foreign teacher with an accent that may cause ambiguity or confusion in the student viewer can be resolved by their checking the text. The ability for the student to immediately and conveniently isolate points of confusion and quickly address them makes learning much less discouraging and frustrating and therefore more enjoyable and productive.

Text and review materials window will only appear at appropriate times and could be configured by the student preferences as well as to when they will be used.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method of capturing and rendering educational information, comprising:
   using at least one processor associated with a recording computer:
   (a) capturing gesture information from a surface digitizing apparatus coupled to the recording computer, and storing in a recording computer memory gestural data that associates the gesture information to a reference frame associated with the surface digitizing apparatus (b) extracting image information from a camera coupled to the recording computer and storing in a recording computer memory image data that associates the image information to a reference frame associated with the camera's field of view, (c) generating recording space calibration data that associates spatial coordinates within the field of view of the camera with spatial coordinates of the surface digitizing apparatus;

(d) sending the gestural data, image data and calibration data to a rendering computer;

using at least one processor associated with a rendering computer coupled to a display device:

(e) receiving the gestural data, image data and calibration data sent by the recording computer;

(f) generating a calibration transform based on the calibration data that converts the gestural data and image data into a form usable by the display device to generate calibrated gestural data and calibrated image data;

(g) using the calibrated gestural data to render a first visual image corresponding to the gestural information captured by the surface digitizing apparatus;

(h) using the calibrated image data to generate a second visual image corresponding to the image information extracted from the camera;

(i) blending the first and second visual images to define a recomposed image made up of combined gesture information and image information that is then displayed on the display device.

2. The method of claim 1 wherein the (b) extracting image information step includes separating moving object information from stationary background information and using only the moving object information to define said image data.

3. The method of claim 1 wherein the blending step further comprises representing the first and second visual images as first and second layers where one of said layers is positioned on top of the other of said layers.

4. The method of claim 3 further comprising receiving playback mode selection input from a user and using said selection input to control which of the first and second layers is positioned on top.

5. The method of claim 1 further comprising using at least one processor associated with a recording computer to capture application-specific event data from an computer program generating educational content concurrently with at least one of steps (a) and (b), and sending the captured application-specific event data to the rendering computer.

6. The method of claim 5 further comprising using at least one processor associated with the rendering computer to run a computer program using the captured application-specific event data and to thereby generate an application-specific image for display.

7. The method of claim 1 wherein the sending and receiving steps (d) and (e) are performed using a networked computer system or telecommunication system.

8. The method of claim 1 wherein the sending and receiving steps (d) and (e) are performed using an intermediary computer-readable storage medium.

9. The method of claim 1 further comprising displaying the recomposed image so that the image information displays in front of the gestural information to simulate a view where a lecturer stands in front of a chalkboard.

10. The method of claim 1 further comprising displaying the recomposed image so that the image information displays behind the gestural information to simulate a view where a lecturer draws on a glass pane positioned between lecturer and audience.

11. The method of claim 6 further comprising displaying the recomposed image so that the gestural information displays in front of the application-specific image to simulate a view where a lecturer draws on a glass pane positioned in front of a displayed computer program.

12. The method of claim 1 wherein at least one of the captured gesture information and the extracted image information is three-dimensional information.

13. The method of claim 5 wherein the application-specific event data represents three-dimensional information.

* * * * *